United States Patent Office 3,141,864
Patented July 21, 1964

3,141,864
PROCESS FOR THE PRODUCTION OF POLYMER-
IZATES OR MIXED POLYMERIZATES OF ACRO-
LEIN AND METHACROLEIN
Karl Heinz Rink, Hanau (Main), Germany, assignor to
Deutsche Gold- und Silber-Scheideanstalt vormals
Roessler, Frankfurt am Main, Germany
No Drawing. Filed June 3, 1960, Ser. No. 33,650
Claims priority, application Germany June 5, 1959
3 Claims. (Cl. 260—67)

The present invention relates to a novel process for the production of polymerizates or mixed polymerizates of acrolein or methacrolein with vinyl compounds and/or alcohols.

An object of the present invention is to provide a novel process either for the oxidative polymerization of acrolein and methacrolein or the mixed oxidative polymerization of acrolein or methacrolein with vinyl compounds and/or alcohols.

A further object of this invention is to provide novel polymers, soluble in water or aqueous solutions of sodium hydroxide, which are useful as films or for the formation of shaped bodies.

The art is aware of several different methods of polymerizing acrolein. Among these procedures there are, for example, the anionic, cationic, redox, and radical polymerization techniques. These procdures lead to the production of either low molecular weight polymers which are soluble in some solvents and also fusable or high molecular weight polymers. The low molecular weight products for the most part have no practical commercial utility in the field of plastics. The high molecular weight materials are practically insoluble and non-fusable so that useful plastic materials cannot be made from them either. It is also known to the art that acrolein can be transformed into disacryl with an extensive heating treatment or by means of a spontaneous polymerization process. In this regard see Redtenbacher, Liebigs Ann. Chem., vol. 47 (1843), page 113.

It is also possible to polymerize acrolein in solution, for example, in a methanolic solution, with the aid of basically reactive materials.

German Patent 878,858 also discloses that mixed polymerizates of acrolein and unsaturated monomeric compounds can be produced by an emulsion polymerization technique.

Recent developments in this field have also shown that polyvalent, macromolecular acids can be produced by treating high molecular weight polyacroleins, which are soluble either in water or in organic solvents, with some organic or inorganic oxidation agents. See in this regard U.S. application S.N. 789,802, filed January 29, 1959, and "Die Makromolekulare Chemie," vol. 32, pages 209 to 217. In this article the authors attempted the use of hydrogen peroxide as an oxidizing agent for polyacrolein. On page 209 of this article polyacrolein is indicated as being completely degraded in the presence of $H_2O_2$. Unexpectedly it has no been found that it is possible to obtain oxidized polymerizates or mixed polymerizates of acrolein or methacrolein by polymerizing the acrolein or methacrolein, with or without at least one other monomeric vinyl compound, in the presence of a polymerization catalyst and a solvent or a dispersion agent if the polymerization is conducted in the presence of larger than catalytic amounts of hydrogen peroxide. The acrolein and hydrogen peroxide are to be used in such proportions in this regard, that 0.05 to 1 mol of hydrogen peroxide (calculated as 100% $H_2O_2$) is to be present for every mol of acrolein to be used. This polymerization process leads to the production of polyvalent macromolecular acids, since an oxidation reaction takes place as well as a polymerization reaction during the course of this novel process. The quantities of hydrogen peroxide used are sufficient to convert at least some of the aldehyde groups to carboxyl groups. By using larger quantities of hydrogen peroxide, within the above mentioned range, it is possible to obtain a greater carboxyl group content in the polymers obtained. Depending on the particular ratio of acrolein or methacrolein to hydrogen peroxide employed, it is possible to obtain acids, which still have some aldehyde groups present in the macromolecular sized polymer or polymers, the aldehyde group content of which has been oxidized as much as possible to carboxyl groups. It is therefore possible, in this novel process, to vary the aldehyde group content of the polymerizates over a wide range by a suitable choice of the quantities of the oxidation agent used.

It was further found that it is also possible, according to the invention, to conduct the polymerization or mixed polymerization in the presence of a mono or polyhydroxy alcohol. In such a case, a complete or partial esterification of the carboxyl groups takes place, depending on the proportions of the reagents that are used. Furthermore, it is also possible in this novel process, to esterify previously formed polymerizates or mixed polymerizates with vinyl compounds. In this latter case also, the degree of esterification of the carboxyl groups depends upon the quantities of reagents used.

The oxidative polymerization of the acrolein or methacrolein, according to the invention, must be initiated in the presence of a catalyst causing acrolein polymerization. Such catalysts include all those known which induce acrolein to polymerize. These include, for example, basically reactive substances such as sodium hydroxide, potassium hydroxide, sodium carbonate, ammonia, piperidine, triethylamine and the like, also redox system catalysts such as ferrous iron sulfate, nitrous acid, potassium ferrocyanide, zinc chloride, manganese sulfate, lead acetate, sodium slfite, sodium dithionite, Rongalite (formaldehyde sodium sulfoxylate), mercuric chloride, or silver nitrate in the presence of catalytic quantities of hydrogen peroxide or a persulfate. Sulfur dioxide is also suitable as a catalyst. By a suitable choice of catalysts it is possible to vary the degree of polymerization, which is relatively low, within a certain range.

When it is desired to produce a mixed polymerizate of monomeric acrolein and another monomeric vinyl compound the catalyst used must cause either the polymerization of the acrolein or the polymerization of the other monomeric vinyl compound. If the hydrogen peroxide is used as a polymerization catalyst for the monomeric vinyl compound, it is not necessary, to use another catalyst. Other catalysts which can be used for the monomeric vinyl compound are those known to the art such as inorganic and organic peroxides, redox systems, azoisobutyric acid nitrile and so forth.

In the process of this invention, the oxidation agent, hydrogen peroxide, is used in quantities which are larger than catalytic amounts. By catalytic quantities, in this regard, it is meant less of $H_2O_2$ than is theoretically needed for the oxidation of 3% of the aldehyde groups of the applied acrolein or methacrolein.

Water is preferably used as the solvent for the oxidative polymerization procedure of this invention. However, organic solvents can also be used to advantage in this invention. If the organic solvent to be used is miscible with the oxidation agent, hydrogen peroxide, or can dissolve it, then the polymerization is conducted in a homogeneous phase. If, on the other hand, the oxidizing agent is not miscible with nor soluble in the organic solvent then the process can still be conducted in a heterogeneous phase. Among the organic solvents which can be used to advantage are, for example, hydrocarbons, such as, benzine, benzene, tolulene, xylene; chlorohydrocarbons, such as methylene chloride, chloroform, carbon tetrachloride, trichloroethylene; esters, such as methylacetate, ethylacetate and butylacetate; and dioxane and ethyl ether.

Water is also preferably used as the solvent for the oxidative mixed polymerization procedure. However, the above mentioned organic solvents can also be used to advantage in this procedure. Depending on the type of solvent used and the selected reaction conditions the oxidative mixed polymerization can be conducted either in solution, emulsion or in suspensions.

With a suitable choice of catalyst and an extensive aldehyde group oxidation, relatively low molecular weight polycarboxylic acids (molecular weight of about 500 to 2,000) are produced which are readily soluble in water or alkaline solutions. Upon being dried these aqueous solutions form glass clear, colorless films. The solubility of these relatively low molecular weight polycarboxylic acids is proportional to the degree of oxidation of the aldehyde groups. That is, the fewer aldehyde groups there are that have been oxidized to carboxyl groups, the more difficult it is to dissolve the product in water. These relatively low molecular weight polycarboxylic acids which are difficult to dissolve in water, however, are soluble in sodium hydroxide solutions and can be reprecipitated from these alkaline solutions with acids. With other catalysts, higher molecular weight polycarboxylic acids (molecular weight of about 2,000 to 7,000) are produced which are insoluble or only partially soluble in water whether partially or completely oxidized, but which are readily soluble in sodium hydroxide solutions and which can be reprecipitated from these alkaline solutions with acid.

The carboxyl group containing mixed polymerizates are also soluble in alkaline mediums, i.e., sodium hydroxide solutions and they can be reprecipitated from these alkaline solutions upon the addition of acid thereto. The solubility of these mixed polymerizates in alkaline solutions is more enhanced the more aldehyde groups of the acrolein radicals there are that have been oxidized to carboxyl groups and the more oxidized acrolein units there are than other vinyl compound units in the mixed polymerizates.

The polymerizates or mixed polymerizates produced by the process of this invention can be used for the production of shaped plastic bodies as well as lacquers. In producing the mixed polymerizates of acrolein or methacrolein with the monomeric vinyl compounds it is preferable that the monomers be used in the ratio of 5:95% to 95:5%.

The other vinyl compounds which are used in this invention can be methyl methacrylate, ethyl ethacrylate, acrylonitrile, vinylacetate, vinylchloride and particularly styrene. By a vinyl compound it is meant a compound having the terminal grouping $CH_2=C<$.

The following examples are illustrative of the scope of the process of this invention and are not intended as a limitation thereof.

*Example 1*

28 g. of acrolein were dissolved in a mixture of 50 cc. of water and 50 cc. of hydrogen peroxide (35% by weight). With this mixture, at 20° C., 0.5 cc. of triethylamine were added to it with stirring. Within 30 seconds the temperature of the entire mixture climbed to 58° C. The system was allowed to react thereafter while being heated with moderate refluxing, until the reflux temperature had risen to 100° C., which required about 1½ hours. In this way a colorless, odorless and practically clear solution was obtained, which was concentrated to the point of containing 20–30% of polycarboxylic acid constituents by distilling off the water present. The polymers had a carboxyl group content of about 95%. A colorless, glass clear coating of film could be made from these concentrated solutions by merely pouring them out and drying them at 100° C.

*Example 2*

28 g. of acrolein were dissolved in a mixture of 50 cc. of water and 25 cc. of hydrogen peroxide (35% by weight). To this mixture, at 20° C., 0.3 cc. of piperidine were added with stirring. Within a few seconds the temperature of the system had risen to 65° C. The system was allowed to react thereafter while being heated with refluxing, until the reflux temperature had climbed to 100° C., which took about 2 hours. Upon cooling, pure white polycarboxylic acids precipitated out and were removed by suction and dried. The yield was 8 g. of 25% of the theoretical and this polymer had a carboxyl group content of about 45%. It was soluble in aqueous sodium hydroxide solution. The residual filtrate still contained lower molecular weight polycarboxylic acids dissolved therein which were recovered therefrom by concentrating the filtrate and adding hydrochloric acid. These lower molecular weight polymers were also useful as colorless, clear films. The water soluble, film forming carboxylic acids produced in this example were such that up to about 50% of their aldehyde groups had been oxidized to carboxyl groups.

*Example 3*

28 g. of acrolein were dissolved in a mixture of 50 cc. of water and 50 cc. of hydrogen peroxide (35% by weight). Gaseous sulfur dioxide was introduced into this mixture, at 20° C., for 2 minutes with stirring. Within 5 minutes the temperature of the system had climbed to 90° C. The reaction was moderated by cooling the system to 50° C. and the system was thereafter allowed to react while being heated with refluxing until the reflux temperature has risen to 100° C., which required about one hour. The resulting material was a practically clear, colorless solution of polycarboxylic acids which had a carboxyl group content of about 100%. Film coatings were made from this solution by pouring it out and allowing it to dry at room temperature. The coatings were glass clear and not sticky.

*Example 4*

28 g. of acrolein were dissolved in a mixture of 50 cc. of water and 20 cc. of hydrogen peroxide (35% by weight). Gaseous sulfur dioxide was then introduced into this mixture at 20° C., with stirring for 2 minutes. Within 10 minutes the temperature of the system had risen to 80° C. The system was allowed to react for 2 hours. It was then cooled and the pure white polycarboxylic acid that precipitated out was removed by suction and dried. The yield was 16 g. or 51% of the theoretical. This polycarboxylic acid had a carboxyl group content of about 40% and was soluble in sodium hydroxide solutions. The filtrate still contained lower molecular weight carboxylic acids which were dissolved therein and which were recovered as in Example 2. These latter acids had a lower molecular weight than the former. The carboxyl group content of these latter polycarboxylic acids was about 40%.

*Example 5*

28 g. of acrolein were dissolved in a mixture of 150 cc. of water and 50 cc. of hydrogen peroxide (35% by weight). To this mixture 0.5 g. of iron-II-sulfate was added. The system was then heated on a water bath at 50–60° C. with stirring for an hour. During this time the polycarboxylic acids precipitated out in the form of an ocher colored powder. The reaction system was then cooled and the powder was removed by suction and dried. The yield was 26 g. or 72% of the theoretical. The carboxy group content was about 90%. It was soluble in sodium hydroxide solutions. The residual, lower molecular weight polycarboxylic acids were still dissolved in the reaction solution and were recovered as in Example 2. The carboxyl group content of the residual polycarboxylic acids was about 95%.

Example 6

28 g. of acrolein and 0.5 g. iron-II-sulfate were dissolved in a mixture of 150 cc. of water and 10 cc. of hydrogen peroxide (35% by weight). The solution was then heated at 50 to 60° C. for an hour, while being stirred, on a water bath. During this time polycarboxylic acid precipitated out in the form of a light yellow colored powder. The solution was cooled and the powder was removed by suction, washed with water and dried. The yield was 29 g. or 96% of the theoretical. The polycarboxylic acid had a carboxyl group content of about 20%. It was soluble in sodium hydroxide solutions and could be reprecipitated from these alkaline solutions with hydrochloric acid.

Example 7

28 g. of acrolein and 0.5 g. of iron-II-sulfate were dissolved in a mixture of 150 cc. of water and 5 cc. of hydrogen peroxide (35% by weight). The solution was heated on the water bath for one hour at 50–60° C. with stirring. During this time polycarboxylic acid precipitated out in the form of a light yellow powder. After the solution was cooled the powder was removed by suction, washed with water and dried. The yield was 28 g. or 97% of the theoretical. The polymer had a carboxyl group content of about 10%. It was soluble in solutions of sodium hydroxide and could be reprecipitated from these solutions with hydrochloric acid.

Example 8

28 g. of acrolein and 0.06 g. of iron-II-sulfate were dissolved in a mixture of 175 cc. of water and 50 cc. of hydrogen peroxide (35% by weight). The solution was heated, with stirring, at 50 to 60° C. for a ½ hour. During this time a polycarboxylic acid product precipitated out in the form of a slightly colored powder which still contained percarboxylic acid groups. This polymer was recoverable at this point by suction and it had a carboxyl group content of 90%. However, if the above powder were not removed from the reaction system at this point and had been heated, with stirring, at 50 to 60° C. for another hour then the powder would have gone completely into solution as the percarboxylic acid groups would have decomposed and the final product would be a clear, colorless solution of polycarboxylic acid. This solution can be used to pour out films of the polycarboxylic acid which will dry at 20° C. to produce clear, colorless filmy coatings. The final polycarboxylic acid product had a carboxyl group content of 90%.

Example 9

28 g. of acrolein, 0.5 g. of potassium persulfate and 0.5 g. of silver nitrate were dissolved in a mixture of 50 cc. of water and 50 cc. of hydrogen peroxide (35% by weight). The system was then heated with stirring until a reflux temperature of 100° C. was attained which required about 2 hours. The resulting, somewhat turbid, colorless solution was filtered and the clear filtrate was poured out as a film which dried at 20° C. to form glass clear, colorless filmy coatings. The polymer had a carboxyl group of about 95%.

Example 10

28 g. of acrolein, 50 cc. of carbon tetrachloride and 25 cc. of hydrogen peroxide (35% by weight) were dispersingly mixed together with stirring. Gaseous sulfur dioxide was then introduced into the mixture, while it was still being stirred, for two minutes. Within 20 minutes the temperature of the system had risen to 58° C. The system was allowed to react and was heated under reflux for another hour and a half. The resulting colorless, granular polymerizate was removed by suction and dried. The yield was 28 g. or 88% of the theoretical. The polymer had a carboxyl group content of about 50%. This polycarboxylic acid was soluble in solutions of sodium hydroxide and could be reprecipitated from these alkaline solutions with acids.

Example 11

28 g. of acrolein and 26 g. of styrene were dispersed, with stirring, into a mixture of 50 cc. of water and 50 cc. of hydrogen peroxide (35% by weight). Thereafter, a moderate stream of sulfur dioxide was introduced into this dispersed mixture at 20° C. for two minutes. Upon the initiation of the polymerization reaction the temperature of the system rose to 98° C. within 15 minutes and simultaneously a white, solid polymerizate began to form. After the initiation of the polymerization reaction the system was heated for another hour at 90° C. The system was then cooled and the polymerizate was removed by suction and dried. The yield was 65%. The polymer was a white, granular mixed polymerizate with a carboxyl group content of about 90%. The product was soluble in 10% solutions of sodium hydroxide and could be reprecipitated from these solutions with acids. The filtrate, remaining after the mixed polymerizate had been recovered, contained dissolved therein a further quantity of polymers with a carboxyl group content of about 90%. This filtrate was used to pour out film which dried at 110° C. to form clear, colorless coatings.

Example 12

40 g. of acrolein and 10 g. of styrene were dispersingly mixed, with stirring, into a mixture of 67 cc. of hydrogen peroxide (35% by weight) and 33 cc. of water. The mixture was then heated on a water bath, under reflux, until the reflux temperature had climbed to 95–100° C., which took about 4 hours. During this time, an intermediary poly-percarboxylic acid compound precipitated out, which in turn was slowly decomposed to a soluble polycarboxylic acid which went into solution. 25% of the resulting carboxyl group containing mixed polymerizates were present as a white powder which was recovered by suction. This white powdered product had a carboxyl group content of about 80%. It was very soluble in sodium hydroxide solutions and could be reprecipitated from these alkaline solutions with acid. The major portion of the resulting carboxyl group containing mixed polymerizates were still dissolved in the filtrate and they could either be recovered from the solution by a process of concentration or the filtrate solution itself could be poured out to form films which, upon being baked or burned in, yielded glass clear, colorless coatings. The filtrate soluble polymers had a carboxyl group content of 80%. The baking or burning in temperature was in the range of 100 to 120° C.

Example 13

A mixture of 28 g. of acrolein, 58 g. of styrene and 100 cc. of butanol was homogenized, with stirring, with 50 cc. of hydrogen peroxide (35% by weight). Thereafter, gaseous sulfur dioxide was introduced into this homogenized mixture for two minutes, at 20° C. The system was then heated for two hours more, with stirring, on a water bath. The system was then a viscous dispersion which, upon standing, slowly separated into two clear layers. The lower, aqueous phase was separated and disposed of. The upper viscous phase was used to pour out film, which upon drying in the air at 20° C. yielded glass clear, colorless and waterproof coatings. The carboxyl group content of the resulting polymer was reduced by partially esterification during the oxidative polymerization.

Example 14

30 g. of acrolein, 20 g. of pentaerythritol, 50 g. of styrene, 50 cc. of butanol and 50 cc. of hydrogen peroxide (35% by weight) were dispersingly mixed together with stirring. Gaseous sulfur dioxide was then introduced into the dispersed mixture for one minute, at 20° C., and the temperature of the system climbed to 90° C. within 8 minutes. The system was then heated for two hours, with stirring, on a boiling water bath. A good yield of colorless, insoluble granules of a mixed polymerizate was thereby obtained. This polymer is not soluble in sodium hydroxide solutions since the carboxyl groups, formed by oxidation of the aldehyde groups, were in turn esterified by the pentaerythritol or the butanol. The resulting polymer was soluble in sodium hydroxide solutions.

*Example 15*

30 g. of acrolein were dispersingly mixed, with stirring, into a mixture of 50 cc. of water and 50 cc. of hydrogen peroxide (35% by weight). 0.3 g. of triethylamine were then added to this dispersed mixture. Within a few seconds the temperature of the system rose to 65° C. The system was allowed to react for another two hours while being heated and under reflux. Then, 15 g. of styrene were added and the new system was heated for two hours more under reflux. A stable, emulsified mixed polymerizate resulted. The emulsion was stable in the presence of basically reactive, aqueous diluents. With the addition of acid, however, the mixed polymerizate precipitated out.

*Example 16*

30 g. of acrolein, 20 g. of ethyl acrylate and 0.5 g. of benzoyl-peroxide were dispersingly mixed, with stirring, into a mixture of 50 cc. of water and 50 cc. of hydrogen peroxide (35% by weight). The dispersed mixture was then heated on a water bath, under reflux, for 3 hours at 95° C. 65% of the mixed polymerizate yield was in the form of a gummy, white polymer which was recovered by suction from the reaction solution and was soluble in sodium hydroxide solutions. This polymer was reprecipitated from the alkaline solutions with acid. A further quantity of carboxyl group containing mixed polymerizates remained dissolved in the filtrate. The dissolved polymer had a carboxyl group content of about 80%. The filtrate was used to pour out films which yielded, upon drying, colorless, glass clear coatings.

*Example 17*

30 g. of acrolein were dispersed, with stirring, into a mixture of 50 cc. of water and 50 cc. of hydrogen peroxide (35% by weight). When the mixture was thereafter cooled to 20° C., 0.3 cc. of triethylamine were added. Within 30 seconds the temperature of the system rose to 50° C. After the system had been allowed to react for two hours while being heated at 95° C. under reflux on a water bath 30 g. of ethyl-acrylate were added and the system was further heated on a boiling water bath for 1½ hours while being stirred. A white, emulsified polymerizate resulted. This emulsion can be diluted with water, or basically reactive, aqueous solutions. Upon the addition of acids to the dilute solution mixed polymerizates precipitate out.

*Example 18*

After 28 g. of acrolein and 55 g. of methylmethacrylate were dispersed, with stirring, into a mixture of 50 cc. of hydrogen peroxide (35% by weight) and 150 cc. of water, gaseous sulfur dioxide was introduced into the mixture for two minutes. Thereupon, the temperature of the system climbed from 20° to 35° C. The system was then allowed to react for two hours while being stirred and heated under reflux on a water bath. A yield of 85% of a white, mixed polymerizate was obtained. The polymer was soluble in solutions of sodium hydroxide and could be reprecipitated from these alkaline solutions with acid.

*Example 19*

30 g. of acrolein were dispersed, by stirring, into a mixture of 50 cc. of water and 50 cc. of hydrogen peroxide (35° by weight). 0.3 cc. of triethylamine were then added to the mixture while it was being cooled at 20° C. After the system had been allowed to react for 2 hours while being heated under reflux on a water bath, it was filtered. 10 g. of methylmethacrylate were then added to the filtrate and this system was heated for another 1½ hours while stirring on a boiling water bath. A white, stable emulsified polymerizate resulted. A mixed polymerizate was recovered as in Example 17. It was soluble in sodium hydroxide solutions.

*Example 20*

After 28 g. of acrolein and 26.5 g. of acrylonitrile were dispersed, by stirring, into a mixture of 50 cc. of hydrogen peroxide (35% by weight) and 150 cc. of water, gaseous sulfur dioxide was introduced into the mixture for two minutes. Within 15 minutes the temperature of the system climbed to 90° C. due to the beginning of the polymerization reaction. After the termination of the auto polymerization reaction the system was heated for two hours, with stirring, on a water bath. A good yield of a light yellow polymerizate was obtained. The polymer was soluble in sodium hydroxide solutions and could be reprecipitated from these solutions with acid.

*Example 21*

After 28 g. of acrolein were dispersed, by stirring, into a mixture of 50 cc. of water and 50 cc. of hydrogen peroxide (35% by weight), 0.3 cc. of triethylamine were added to the dispersed mixture. Within 2 minutes the temperature of the system climbed to 50° C. The system was allowed to react for another two hours while being heated under reflux on a water bath. Then, 75 cc. of water were distilled off by a vacuum distillation on the water bath. The residual, viscose, colorless solution of polycarboxylic acid was then mixed with 28 g. of acrolein and this latter system, in turn, was further heated for three hours on the water bath, with stirring, under moderate reflux. The final product was a white, granular mixed polymerizate, which was not soluble in sodium hydroxide solutions since the carboxyl groups of the polycarboxylic acids, formed during the previous polymerization reaction, were blocked by an esterification process which obviously occurred upon the addition of the second charge of acrolein.

When gaseous sulfur dioxide was used in the above examples, it was introduced at the rate of 30 to 150 ml.

Having now described the means by which the objects of the invention are obtained,

I claim:

1. In a process for the production of homopolymerization products from an acrolein compound selected from the group consisting of acrolein and methacrolein in the presence of a redox polymerization catalyst system, the step comprising conducting the polymerization in a liquid medium in the presence of 10 to 100 mol percent of hydrogen peroxide based upon said acrolein compound to produce a polymerization product in which about 10 to 100% of the aldehyde groups supplied by the acrolein compound have been oxidized to carboxyl groups.

2. A process as in claim 1 in which said liquid medium is an organic solvent.

3. A process as in claim 1 in which about 1 mol of hydrogen peroxide is used for every mol of said acrolein compound.

References Cited in the file of this patent

UNITED STATES PATENTS

| | | |
|---|---|---|
| 2,416,536 | Neher et al. | Feb. 25, 1947 |
| 2,657,192 | Miller et al. | Oct. 27, 1953 |
| 2,789,099 | Rife et al. | Apr. 16, 1957 |
| 2,993,878 | Marks et al. | July 25, 1961 |

FOREIGN PATENTS

| | | |
|---|---|---|
| 803,053 | Great Britain | Oct. 15, 1958 |